United States Patent
Ichimiya

(10) Patent No.: US 9,247,122 B2
(45) Date of Patent: Jan. 26, 2016

(54) FOCUS ADJUSTMENT APPARATUS AND CONTROL METHOD THEREFOR

(71) Applicant: CANON KABUSHIKI KAISHA, Tokyo (JP)

(72) Inventor: Takashi Ichimiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 36 days.

(21) Appl. No.: 13/917,412

(22) Filed: Jun. 13, 2013

(65) Prior Publication Data
US 2013/0335614 A1     Dec. 19, 2013

(30) Foreign Application Priority Data
Jun. 19, 2012   (JP) ................. 2012-137923

(51) Int. Cl.
H04N 5/232    (2006.01)
G02B 7/34    (2006.01)

(52) U.S. Cl.
CPC ............ *H04N 5/23212* (2013.01); *G02B 7/346* (2013.01)

(58) Field of Classification Search
CPC .................................................... G02B 7/346
USPC ..................... 348/345, 346, 349, 350, 333.11
See application file for complete search history.

(56) References Cited

U.S. PATENT DOCUMENTS

2011/0228127 A1* 9/2011 Nakagawa ................. 348/222.1
2012/0237193 A1* 9/2012 Kawarada ....................... 396/95

FOREIGN PATENT DOCUMENTS

JP     2007052072 A     3/2007
JP     2011232544 A     11/2011

* cited by examiner

*Primary Examiner* — Nhan T Tran
*Assistant Examiner* — Chan Nguyen
(74) *Attorney, Agent, or Firm* — Canon USA, Inc. IP Division

(57) ABSTRACT

A focus adjustment apparatus that displays an in-focus state in a display region in association with control of a focus lens position. The apparatus includes a signal generation unit configured to output a pair of image signals from a focus detection region having a plurality of corresponding display regions, the image signals being generated by photoelectrically converting light having passed through an imaging optical system, and a control unit configured to detect a phase difference of the pair of image signals output from the focus detection region, and to control a position of the focus lens based on the phase difference detection result. The control unit detects the phase difference corresponding to divided regions formed by dividing the focus detection region, and displays an in-focus state in the display region in accordance with the control of the focus lens position control based on the phase difference detection result.

15 Claims, 15 Drawing Sheets

PLAN VIEW

CROSS-SECTIONAL VIEW
OF SECTION A-A

PLAN VIEW

CROSS-SECTIONAL VIEW OF SECTION A-A

CROSS-SECTIONAL VIEW
OF SECTION A-A

PLAN VIEW

FOCUS ADJUSTMENT APPARATUS AND CONTROL METHOD THEREFOR

BACKGROUND OF THE INVENTION

1. Field of the Invention

The present invention relates to a focus adjustment apparatus used for image capturing apparatuses, such as still cameras, video cameras, or various observation apparatuses.

2. Description of the Related Art

Conventionally, for performing automatic focus (AF) in a camera, a focus detection apparatus with a so-called phase difference detection method is known. In the phase difference detection method, a light flux from an object, having passed through different exit pupil regions of a photographic lens, is caused to form an optical image on each of a pair of line sensors, and photoelectrically converted into a pair of object images. Thereafter, based on the object images, an amount of displacement between relative positions of the pair of object images is calculated (hereinafter, referred to as phase difference calculation). To perform autofocus, the photographic lens is driven based on the defocus amount obtained by the phase difference calculation. In the focus detection apparatus of this type, line sensors are arranged at positions corresponding to each of a plurality of AF frames (focus points). An example of this technique is discussed in Japanese Patent Application Laid-Open No. 2011-232544.

In recent years, for the purpose of an enhancement of AF performance, the number of AF frames has been increased. When the number of AF frames is increased, owing to restriction of an optical layout, a plurality of AF frames may be arranged in high density with respect to a pair of line sensors. In this case, a plurality of AF frames corresponding to the line sensors with which the focus control has been performed will be displayed. However, the focusing result for an object is obtained in which an AF frame, among the plurality of AF frames, cannot be displayed to inform the user of the AF state. As a result, whether optimum focus is achieved on a user's intended target may not be known by display.

SUMMARY OF THE INVENTION

At least one embodiment of the present invention is directed to a focus adjustment apparatus capable of allowing a user to visually recognize a focused object more reliably in a camera that performs AF with a multipoint AF system.

According to an aspect of the present invention, a focus adjustment apparatus configured to display an in-focus state in a display region in accordance with control of a focus lens position, includes a signal generation unit configured to output a pair of image signals from a focus detection region having a plurality of corresponding display regions, the image signals being generated by photoelectrically converting light having passed through an imaging optical system, and a control unit configured to detect a phase difference of the pair of image signals output from the focus detection region, and to control a position of the focus lens based on the phase difference detection result, wherein the control unit detects the phase difference corresponding to divided regions formed by dividing the focus detection region, and displays an in-focus state in the display region in accordance with the control of the focus lens position based on the phase difference detection result corresponding to the divided regions.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
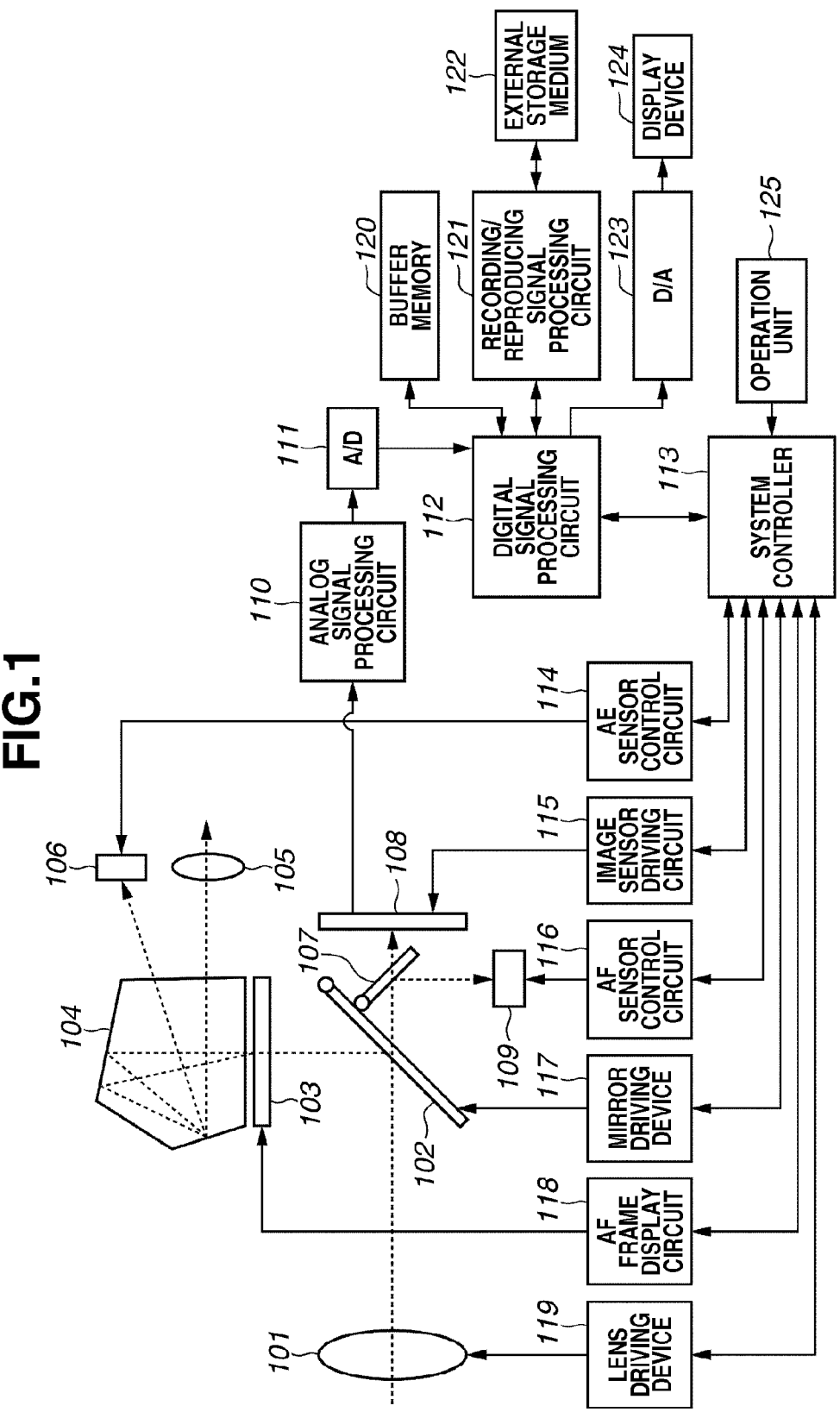
FIG. 1 is a block diagram illustrating a camera configuration according to an exemplary embodiment of the present invention.

FIG. 1 illustrates an example of a camera, as one embodiment of the present invention. In FIG. 1, a light flux having passed through an imaging optical system including a photographic lens 101 forms an optical image of an object on an image sensor 108. The photographic lens 101 includes a focus lens; the focus lens is used to perform focus adjustment by moving it in an optical axis direction. The image sensor 108 is a charge coupled device (CCD) sensor or complementary metal-oxide-semiconductor (CMOS) sensor, and outputs an image signal obtained by converting the optical image of the object into an electric charge according to a light quantity of the formed optical image incident on the sensor.

A main mirror 102 having a semi-transparent area is retracted to the outside of the imaging light flux when capturing an image, and is obliquely placed within an imaging optical path when detecting a focus state of an intended target object. In FIG. 1, a state where the mirror is inserted into the imaging light flux (mirror down) is illustrated. The main mirror 102 guides, while being obliquely placed within the imaging optical path, a part of the light flux having passed through the imaging optical system to a finder optical system that includes an AF frame display device 103, a pentaprism 104, and an eyepiece lens 105, and to an AE sensor 106 arranged on top of the eyepiece lens 105. The AF frame display device 103 is a transparent type liquid crystal, and allows a photographer to confirm an AF frame on an imaging screen through a finder by displaying the AF frame. The AE sensor 106 is an area sensor including multiple pixels for capturing an object image for a luminance value of the imaging screen or the object recognition. At pixel portion, primary color filters of R (red), G (green), and B (blue) are provided. Accordingly, RGB signals of the object image can be output.

A sub-mirror 107 is foldable, expandable with respect to the main mirror 102 in synchronization with an operation of the main mirror 102. A part of the light flux having passed through the semi-transparent area of the main mirror 102 is reflected downward by the sub-mirror 107, and is incident on an AF sensor 109 and photoelectrically converted into electric signals, and a pair of image signals is thus generated.

Figure 2:
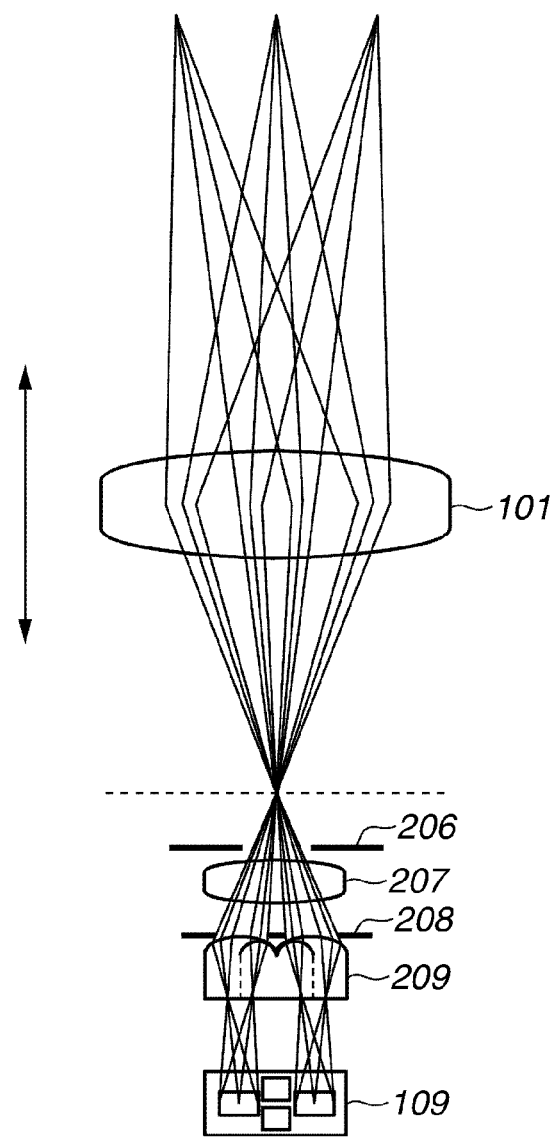
FIG. 2 is a diagram illustrating a detailed configuration of an optical system for focus detection through a phase difference detection method.

The detailed configuration of an optical system for focus detection by the phase difference detection method will now be described with reference to FIG. 2. The light once reflected by the sub-mirror 107 forms an image in the vicinity of a FOV mask 206 located on a plane conjugate to an imaging plane. In FIG. 2, an optical path reflected and turned down by the sub-mirror 107 is illustrated in a developing manner. The FOV mask 206 is a member for blocking unwanted light other than a focus detection region (AF frame) within the frame. A field lens 207 has a function to form an image of respective aperture openings of a diaphragm 208 in the neighborhood of an exit pupil of the photographic lens 101. A secondary imaging lens 209 is arranged on the rear side of the diaphragm 208, and respective lenses correspond to respective aperture openings of the diaphragm 208. Respective light fluxes having passed through the FOV mask 206, the field lens 207, the diaphragm 208, and the secondary imaging lens 209 form images on the line sensors on an AF sensor 109.

Further, the AF sensor 109 is configured so that the light fluxes from different objects within the imaging scene can form images. The AF sensor 109 detects relative positional shift amount in a division direction of the light flux (from an object) having passed through the imaging optical system, based on the above-described pair of generated image signals. Turning back to FIG. 1, a system controller 113 controls a position of the focus lens to an in-focus position detected based on an output of the AF sensor 109.

The system controller 113 including a central processing unit (CPU) that performs control of the entire camera, and a random access memory (RAM) serving as a storage device controls, as appropriate, operations of respective components described below. A lens driving device 119 is connected to the system controller 113, and is provided with a communication circuit (represented by a bidirectional arrow) that performs communication with the photographic lens 101, a lens driving mechanism that performs lens driving to perform focus adjustment, and a driving circuit thereof. An AF frame display circuit 118 is connected to the system controller 113, and controls the AF frame display device 103 to display the AF frames. A mirror driving circuit 117 is connected to the system controller 113, and drives the main mirror 102 to and away (outside) the imaging light flux. An AF sensor control circuit 116 is connected to the system controller 113, and controls the AF sensor 109. An image sensor driving circuit 115 is connected to the system controller 113, and drives the image sensor 108. An AE sensor control circuit 114 is connected to the system controller 113, and drives an AE sensor 106. The AE sensor control circuit 114 calculates a luminance value of an object, based on RGB signals of the object image output from the AE sensor 106, and detects a particular region (e.g., a face) of the target object based on luminance distribution information and/or color information.

An image signal determined according to a light quantity of an object optical image formed on the image sensor 108 is input into an analog signal processing circuit 110, and is converted from an analog signal to a digital signal by an analog-to-digital (A/D) converter 111. A digital signal processing circuit 112 is connected to the system controller 113, and performs image processing such as shading correction or gamma correction on the A/D converted signal.

A buffer memory 120 is connected to the digital signal processing circuit 112, and is a frame memory that can store data for a plurality of frames captured by the image sensor 108. The A/D converted signals are temporarily stored in the buffer memory 120. In the digital signal processing circuit 112, each processing described above is performed after reading the data stored in the buffer memory 120, and the processed data is again stored in the buffer memory 120.

A recording/reproducing signal processing circuit 121 is connected to the digital signal processing circuit 112, records the image data in an external storage medium 122 such as a memory card, after temporarily storing image data, in the buffer memory 120, having subjected to various types of processing by the digital signal processing circuit 112. When the image data is recorded in the external storage medium 122, the recording/reproducing signal processing circuit 121 performs compression of the image data, for example, data compression by joint photographic experts group (JPEG) process. On the other hand, when reading the image data from the external storage medium 122, the recording/reproducing signal processing circuit 121 performs decompression processing of the image data. In the recording/reproducing signal processing circuit 121, an interface for performing data communication with the external storage medium 122 is also included.

A display device 124 displays captured images. There are two patterns for displaying the images captured by the image sensor 108 on the display device 124. One is a display pattern called a live view for sequentially updating and displaying the images repetitively captured by the image sensor 108, while the main mirror 102 is moved to the outside of the imaging light flux. Another is a display pattern called a freeze frame for displaying an image captured by the image sensor 108 for a predetermined time, after release operation of the camera. Further, the display device 124 is also used when image data recorded previously in the external storage medium 122 is again reproduced and displayed. In a case where an image is displayed on the display device 124, the image data stored previously in the buffer memory 120 is read out, and a digital-to-analog (D/A) converter 123 converts the digital image data into analog video signals. Then, images are displayed on the display device 124 using the analog video signals.

An operation unit 125 is connected to the system controller 113, and is provided with operation members for operating the camera including a power switch for turning power of the camera on and off, a release button, and a setting button for selecting an image capturing mode such as human image capturing mode. When these switches and buttons are operated, a signal corresponding to the operation is input into the system controller 113. With the release button, a SW1 which is turned on by a first stroke operation (half-press operation) of the release button operated by a photographer, and a SW2 which is turned on by a second stroke operation (full-press operation) of the release button, are included.

Figure 3:
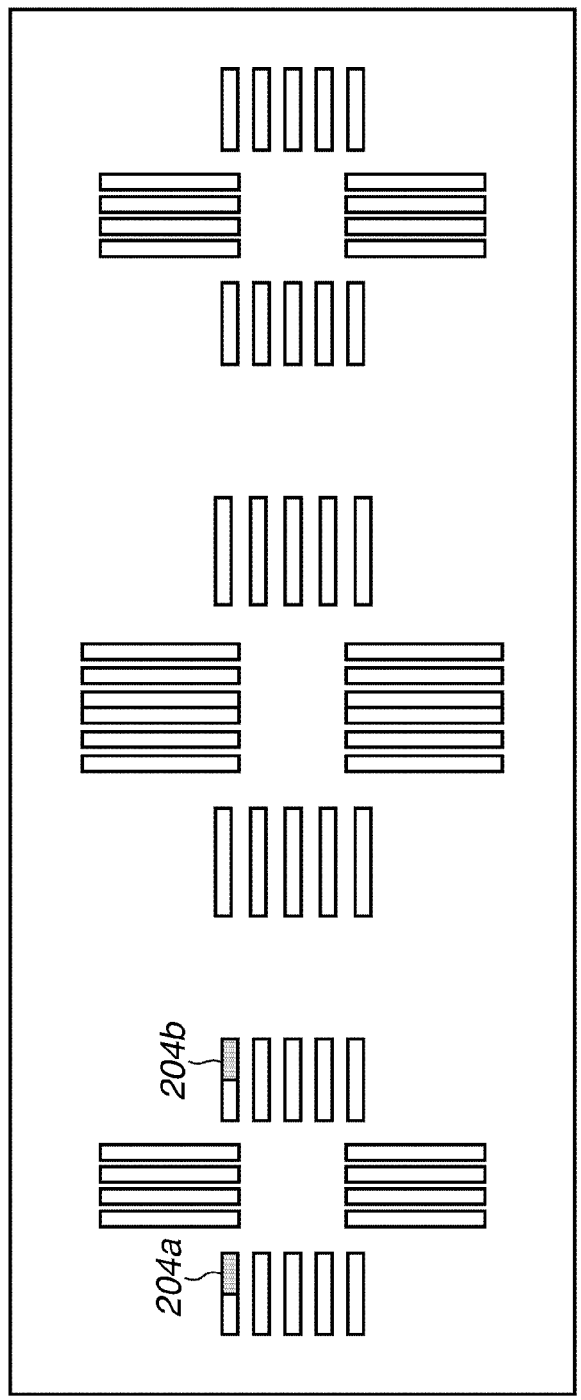
FIG. 3 is a diagram illustrating an arrangement of line sensors according to an exemplary embodiment of the present invention.

The line sensors (signal generation section) on the AF sensor 109 within the imaging screen will be described referring to FIG. 3 and FIG. 4. FIG. 3 is an arrangement diagram of a plurality of line sensors provided on the AF sensor 109, and illustrates a state where the AF sensor 109 is viewed from the front. The present invention can be applied to an AF sensor provided with one or more line sensors each having a plurality of corresponding AF frames. Each line sensor is composed of a plurality of pixels. For example, a line sensor 204a and a line sensor 204b of FIG. 3 receive light from substantially the same regions of the object by the secondary imaging lens 209, and are in an optically paired relationship.

Figure 4A:
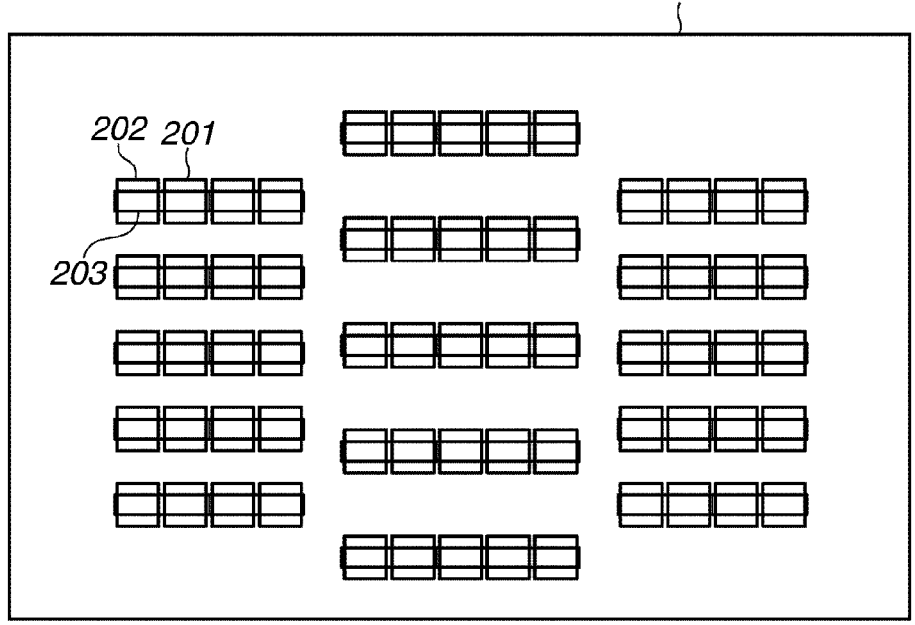
FIGS. 4A, 4B, and 4C are diagrams illustrating a positional relationship between AF frames and line sensor fields of view (FOVs) according to a first exemplary embodiment.
Figure 4B:
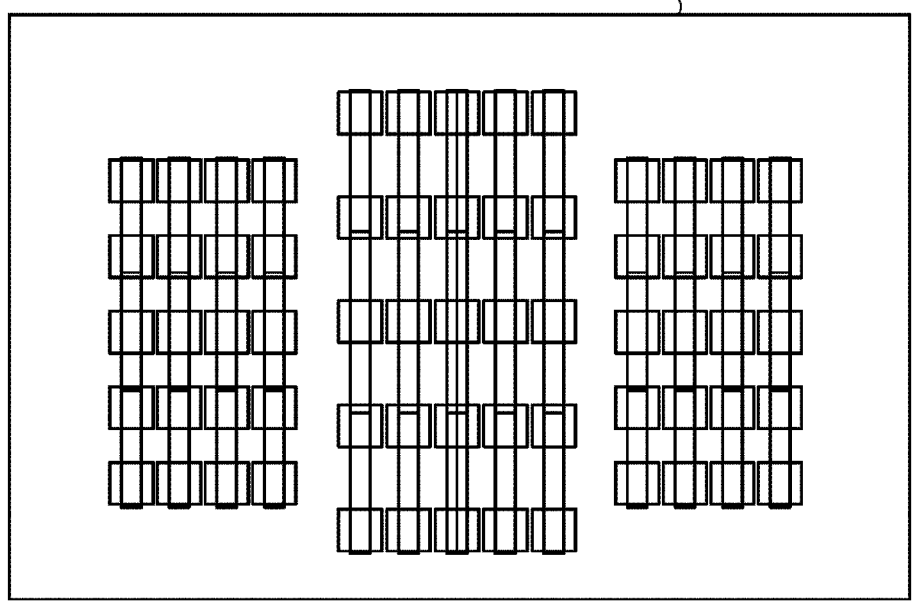
Figure 4C:
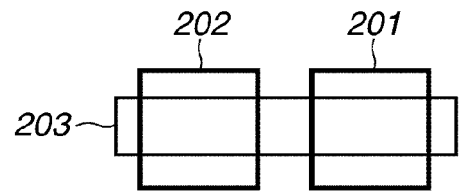

FIGS. 4A and 4B are diagrams illustrating reverse projection of the line sensors in FIG. 3 into a finder field of view (FOV) 200, and illustrates positional relationship between the AF frames and the line sensor fields of view (FOVs). FIG. 4A illustrates lateral line sensor FOVs, and FIG. 4B illustrates longitudinal line sensor fields of view. A line sensor FOV 203 in FIG. 4A corresponds to the line sensor 204a and the line sensor 204b in FIG. 3. The AF sensor 109 is provided with a plurality of line sensors, and at a position corresponding to the line sensor FOV 203 among them two AF frames (an AF frame 201 and AF frame 202) are arranged. An enlarged diagram thereof is illustrated in FIG. 4C. An AF frame is equivalent to a display region according to the present invention.

In a first exemplary embodiment, descriptions will be given based on the premise that a focus detection result based on signals obtained by the line sensor 204a and the line sensor 204b of FIG. 3 has the best reliability level as compared with other line sensors, and focus adjustment control is performed based on signals output from the line sensor 204a and the line sensor 204b. In the descriptions hereinbelow, the line sensor 204a and the line sensor 204b are referred to as line sensors corresponding to the line sensor field of view (FOV) 203.

Figure 5:
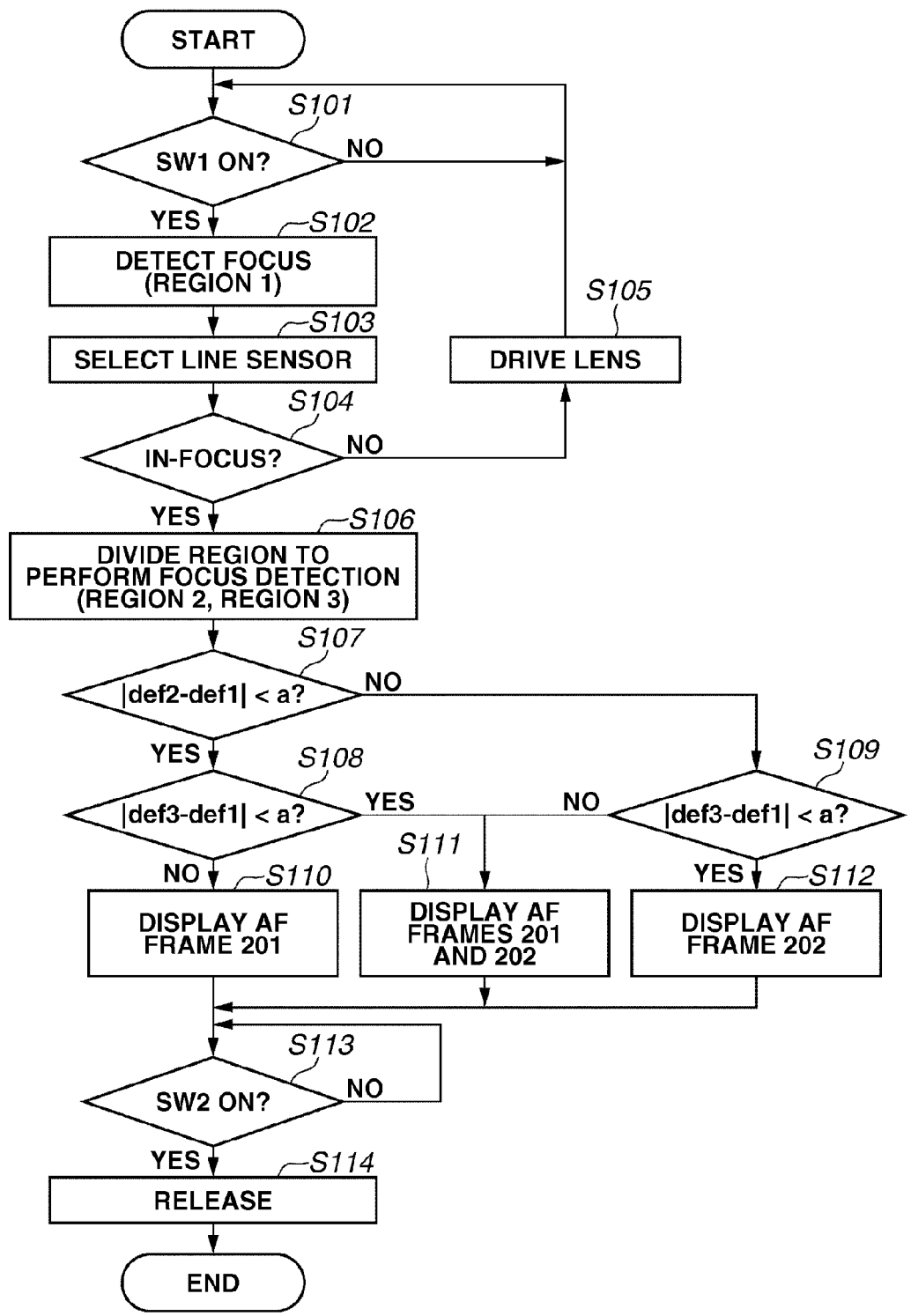
FIG. 5 is a flowchart illustrating an AF operation according to the first exemplary embodiment.

The focus adjustment operation in the camera according to the first exemplary embodiment will be described with reference to a flowchart in FIG. 5. In step S101, the system controller 113 determines whether the SW1 is turned ON. If the SW1 is not turned on (NO in step S101), the processing is repeated until the SW1 is turned ON. On the other hand, if the SW1 is turned on (YES in step S101), the processing proceeds to step S102.

In step S102, the system controller 113 controls the AF sensor 109 via the AF sensor control circuit 116 to acquire a pair of image signals from accumulated electric charges. Then, the system controller 113 performs focus detection through correlation calculation (phase difference calculation), which is a publicly known technique, based on a pair of image signals obtained from each of a plurality of line sensor pairs. In this case, the calculation is performed using a region 1 (whole area) of respective line sensors. For example, a case of calculating in the whole area of the line sensor 204a and the line sensor 204b of FIG. 3 corresponds to the calculation of the region 1. In this way, by taking relatively a wide region as a calculation range in a stage of in-focus determination, focus detection can be performed even when the focusing state of the photographic lens 101 is significantly defocused. Further, an acquisition ratio of object contrast is increased, and as a result, the reliability level of the detection result can be enhanced.

In step S103, the system controller 113 calculates a reliability for each detection result of a plurality of line sensor pairs obtained in step S102, and determines and selects one with the highest reliability. As an evaluation value of reliability, an S level (Select Level) value or the like discussed in, for example, Japanese Patent Application Laid-Open NO. 2007-052072 may be used. Herein, based on the premise that a detection result of the line sensors corresponding to the line sensor FOV 203 is selected by the reliability level determination, a display method for AF frame will be described below.

In step S104, the system controller 113 determines whether the focusing state is in-focus from a detection result def1 of the line sensors corresponding to the line sensor FOV 203 selected in step S103. If the detection result def1 is within a range of in-focus determination value, for example, not larger than $\frac{1}{4}F\delta$ (F: aperture value of lens, δ: permissible circle-of-confusion diameter, for example, for δ=20 μm, 10 μm in full-aperture opening of F2.0 lens), the system controller 113 determines that the focusing state is in-focus (YES in step S104), and the processing proceeds to step S106. On the other hand, if the detection result def1 is larger than the in-focus determination value (for example, $\frac{1}{4}F\delta$) (NO in step S104), the processing proceeds to step S105.

In step S105, the system controller 113 converts the detection result def1 into a number of pulses, which is a driving amount of the lens, and drives the photographic lens 101 via the lens driving device 119, and the processing returns to step S101. Until it is determined that the focusing state is in-focus in step S104, operations in steps S101 to S105 are repeated.

In this process, the AF frames corresponding to the line sensor FOV 203 are two of the AF frame 201 and the AF frame 202. Although both the AF frame 201 and the AF frame 202 may be displayed, the user's intended object may be included in only the one AF frame depending on a status of the object. In such a case, when both of the AF frames are displayed, the user cannot determine whether focus is achieved on the AF frame in which the intended object is included, or focus is achieved on the other AF frame. Thus, in a case where a focus detection result corresponding to one AF frame contributes more strongly than the other AF frame to the focus detection result of the entire region 1, control is performed to display only the AF frame which contributes more strongly.

Figure 6:
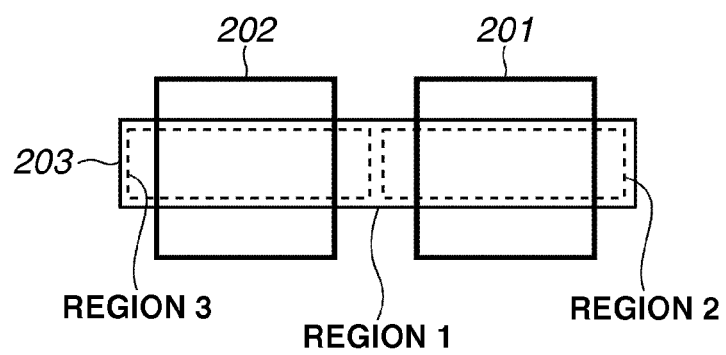
FIG. 6 is a diagram illustrating an arrangement of AF frames and line sensors according to a second exemplary embodiment.

In step S106, the system controller 113 performs focus detection by dividing the region 1 in order to perform the display determination for the AF frame 201 and the AF frame 202 corresponding to the line sensor FOV 203. FIG. 6 illustrates regions of the line sensor FOV 203 for the display determination. In step S106, the system controller 113 performs phase difference calculation on each of the divided regions, using electric charge accumulation result (photoelectric conversion result) performed in step S102. The detection result calculated on a region 2 as one of the divided regions (right half of the line sensor FOV 203) is defined as def2. Further, the detection result calculated on a region 3 as another divided region (left half of the line sensor FOV 203) is defined as def3. The region 2 and the region 3 correspond to a first divided region and a second divided region, respectively. In this case, the detection result def2 corresponds to an object of the AF frame 201, and the focus detection result def3 corresponds to an object of the AF frame 202.

The operations performed in the following steps S107 to S109 are related to a display determination operation. In step S107, the system controller 113 determines whether a difference between the detection result deft of step S106 and the detection result def1 before the division of step S102 is smaller than a determination value "a" (first predetermined value). If the difference (|def2−def1|) is smaller than the predetermined determination value "a" (YES in step S107), the processing proceeds to step S108. On the other hand, if the difference (|def2−def1|) is not smaller than the determination value "a" (not smaller than the first predetermined value) (NO in step S107), the processing proceeds to step S109. In this process, the determination value "a" is set to a larger value (for example, 4Fδ) than the in-focus determination value. Accordingly, in a case where a detection error caused by narrowing the calculation region can be permitted, and only the detection result of one region is far apart from the detection result of the region 1, the number of displays of the AF frames can be decreased.

In step S107, the system controller 113 may determine whether |def2| in place of |def2−def1| is smaller than a determination value "a'". The determination value "a'" in this case is set to a larger value than the in-focus determination value.

In step S108, the system controller 113 determines a difference between the detection result def3 in step S106 and the detection result def1 in step S102. If the difference (|def3−def1|) is smaller than the determination value "a" (YES in step S108), the processing proceeds to step S111. On the other hand, if the difference (|def3−def1|) is not smaller than the determination value "a" (not smaller than the first predetermined value) (NO in step S108), the processing proceeds to step S110.

In step S111, the system controller 113 displays both of the AF frame 201 and the AF frame 202 via the AF frame display circuit 118 in the AF frame display device 103. This is because the detection result deft and detection result def3 substantially coincide with the detection result deft, based on the display determinations in steps S107 and S108, thereby it is determined that the main object exists both in the AF frame 201 and the AF frame 202.

In step S110, the system controller 113 displays the AF frame 201 in the AF frame display device 103 via the AF frame display circuit 118. This is because only the detection result def3 is significantly different from the detection result deft, based on the display determinations in steps S107 and S108, and the detection result of the AF frame 202 is determined to be a result corresponding to the background or the like which departs from the main object, and it is determined that the main object exists in the AF frame 201.

On the other hand, when the processing proceeds to step S109, the system controller 113 also determines a difference between the detection result def3 in step S106 and the detection result def1 in step S102. If a difference (|def3−def1|) is smaller than the determination value "a" (YES in step S109), the processing proceeds to step S112. On the other hand, if the difference (|def3−def1|) is not smaller than the determination value "a" (NO in step S109), the processing proceeds to step S111, and both of the AF frame 201 and the AF frame 202 are displayed. This is because it cannot be determined whether the main object exists either in the AF frame 201 or in the AF frame 202, since the detection result def2 and the detection result def3 are both significantly different from the detection result def1.

In steps S108 and S109, it may be determined whether |def3| in place of |def3−def1| is smaller than the determination value "a'".

In step S112, the system controller 113 displays the AF frame 202 in the AF frame display device 103 via the AF frame display circuit 118. This is because since only the detection result def2 is significantly different from the detection result def1 through the display determinations in steps S107 to S109, the detection result of the AF frame 201 is obtained from the background or the like departing from the main object, and it is determined that the main object exists in the AF frame 202.

In step S113, the system controller 113 determines whether the SW2, which is one of the operation unit 125, is turned ON. If the SW2 is not turned ON (NO in step S113), the operation in step S113 is repeated. On the other hand, if the SW2 is turned on (YES in step S113), the processing proceeds to step S114.

In step S114, the system controller 113 drives the main mirror 102 to the outside of the imaging light flux via the mirror driving circuit 117, and drives the image sensor 108 to capture an image via the image sensor driving circuit 115.

After having performed focus detection with respect to the divided regions in step S106, the system controller 113 may perform calculation of reliabilities similarly to that in step S103 with respect to respective focus detection results before display determination operation. If both reliabilities of the region 2 and the region 3 are larger than the predetermined threshold value, as a result of having calculated the reliabilities, the processing proceeds to display determination operation in step S107. On the other hand, if at least one of reliabilities of the region 2 and the region 3 is not larger than the threshold value, the processing proceeds to step S111, and the system controller 113 displays both the AF frame 201 and the AF frame 202. By performing a display determination operation in a case where the reliabilities of focus detection results for both of the divided regions are thus high, an erroneous determination due to a detection error can be prevented.

As described above, in the present exemplary embodiment, by performing calculation of the region 2 and the region 3 narrower than the region 1 (whole area of the line sensor FOV 203), at the time of focus detection for display determination (step S106), it can be determined whether the main object exists in an AF frame corresponding to either the region 2 or the region 3. At that time, by using a larger value than the in-focus determination value as a determination value of the AF frame display, appropriate AF frame display can be performed, while enhancing in-focus accuracy.

In the present exemplary embodiment, calculation results of the region 2 and the region 3 are not used for in-focus control of the focus lens, but are used only for determination of the AF frame display. This is because there is a high possibility that an object cannot be captured in the region 2 or the region 3, or edges cannot be obtained, since the line sensors and the AF frames are arranged with high density. Further, release time lag can be lessened by not using calculation results of the region 2 and the region 3 for in-focus control of the focus lens.

Furthermore, in the present exemplary embodiment, the number of calculations can be decreased, by performing correlation calculation for display determination after performing in-focus detection. This is because correlation calculation can be performed based on a detection result def1, which has been already determined as within in-focus range, when correlation calculation for display determination is performed (step S106). The increase in release time lag can be restrained, by decreasing the number of calculations.

In the first exemplary embodiment, the correlation calculation is performed again on narrow regions (the region 2 and the region 3) corresponding to the AF frames, after in-focus in order to perform display determination. In a second exemplary embodiment, contrast values in narrow regions (the region 2 and the region 3) corresponding to the AF frames are used at the time of display determination. The configuration of the camera and arrangement of the line sensors are similar to those of the first exemplary embodiment, and therefore descriptions thereof will not be repeated.

Figure 7:
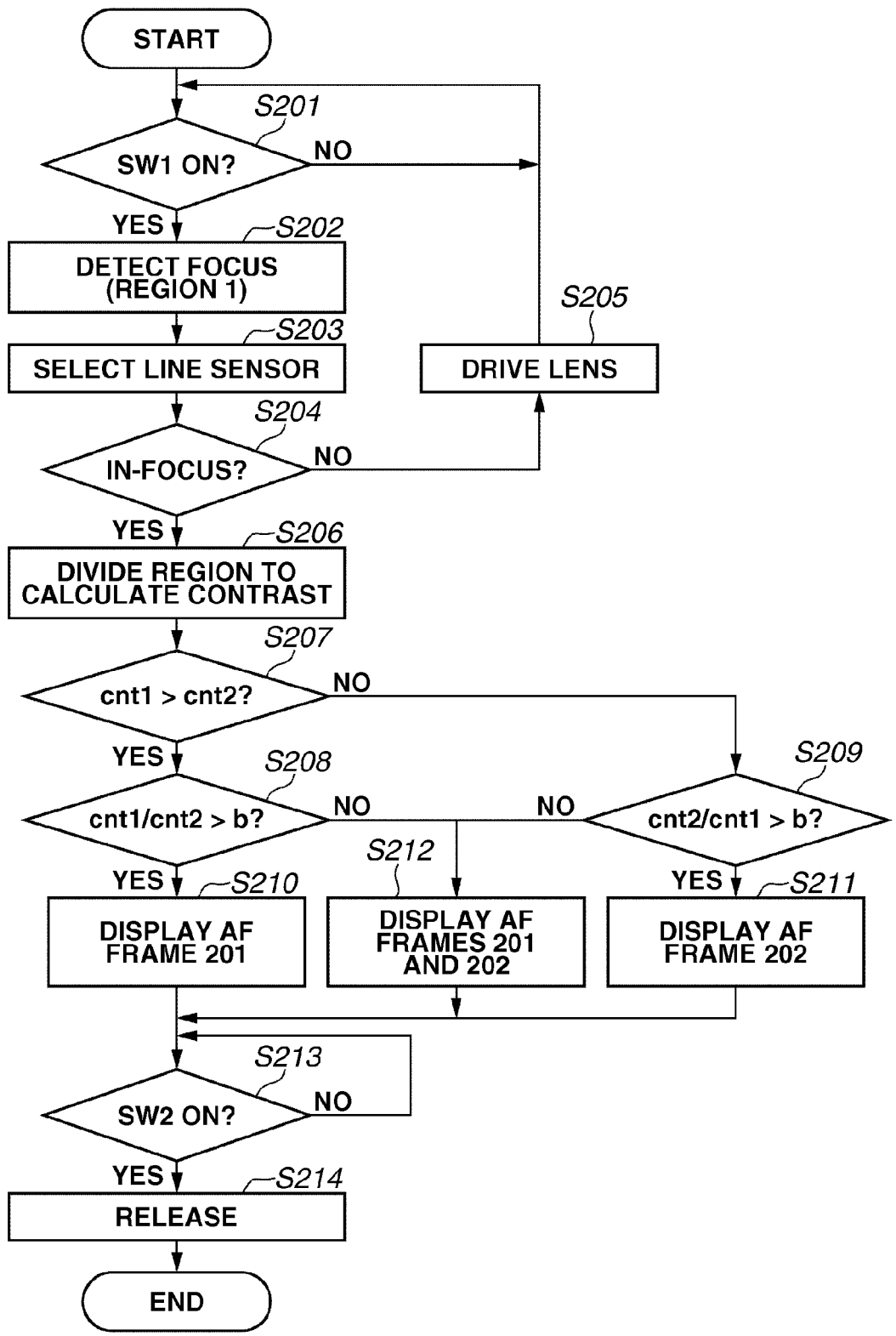
FIG. 7 is a flowchart illustrating an AF operation according to the second exemplary embodiment.

A focus adjustment operation in a camera according to the present exemplary embodiment will be described with reference to a flowchart in FIG. 7. In step S201, the system controller 113 determines whether the SW1 is turned ON. If the SW1 is not turned on (NO in step S201), the processing is repeated until the SW1 becomes turned on. On the other hand, if the SW1 is turned on (YES in step S201), the processing proceeds to step S202.

In step S202, the system controller 113 controls the AF sensor 109 via the AF sensor control circuit 116, and acquires a pair of image signals. Then, the system controller 113 performs focus detection through correlation calculation, which is a publicly known technique, based on a pair of image signals obtained from each of a plurality of line sensor pairs. In this process, calculation is performed on the region 1 (whole area) of respective line sensors. For example, a case where calculation is performed on a whole area of the line sensor 204a and the line sensor 204b in FIG. 3 corresponds to the calculation on the region 1. In this way, by taking relatively wide region as a calculation range in a stage of in-focus determination, focus detection can be performed even when the focusing state of the photographic lens 101 is significantly defocused. Further, a capturing ratio of an object contrast is increased, and as a result, the reliability level of the detection result can be enhanced.

In step S203, the system controller 113 calculates a reliability for each of the detection results of the plurality of pairs of line sensors obtained in step S202, and determines and selects one with the highest reliability. In this case, a display method for AF frame will be described below, based on the premise that a detection result of the line sensors corresponding to the line sensor FOV 203 is selected by the reliability level determination.

In step S204, the system controller 113 determines whether the focusing state is in-focus from a detection result def1 of the line sensors corresponding to the line sensor FOV 203 selected in step S203. If the detection result def1 is within a range of in-focus determination value, for example, not larger than ¼Fδ, the system controller 113 determines that the focusing state is in-focus (YES in step S204), and the processing proceeds to step S206. On the other hand, if the detection result def1 is greater than the in-focus determination value (for example, ¼Fδ) (NO in step S204), the processing proceeds to step S205.

In step S205, the system controller 113 converts the detection result def1 into the number of pulses, which is a driving amount of the lens, and drives the photographic lens 101 via the lens driving device 119, and the processing returns to step S201. Until it is determined that the focusing state is in-focus in step S204, operations in steps S201 to S205 are repeated.

In step S206, the system controller 113 performs contrast calculation by dividing the region 1 to perform display determination of the AF frame 201 and the AF frame 202 corresponding to the line sensor FOV 203. That is, the system controller 113 calculates the contrast of the region 2 and the contrast of the region 3 of FIG. 6. In this process, the system controller 113 calculates contrast values as contrast calculation by integrating differences of adjacent pixel signals. The region 2 and the region 3 correspond to a first display region and a second display region, respectively. The contrast value of the region 1 corresponding to the AF frame 201 is defined as cnt1, and the contrast value of the region 2 corresponding to the AF frame 202 is defined as cnt2.

The operations performed in the following steps S207 to S209 are related to a display determination operation. In step S207, the system controller 113 compares the contrast values cnt1 and cnt2 calculated in step S206. If cnt1 is larger than cnt2 (YES in step S207), the processing proceeds to step S208. If cnt1 is not larger than cnt2 (NO in step S207), the processing proceeds to step S209.

In step S208, the system controller 113 determines whether the ratio of the contrast values cnt1 to cnt2 (ratio of contrasts) calculated in step S206 is larger than a predetermined value. If the ratio of cnt1/cnt2 is larger than the predetermined determination value "b" (larger than a predetermined ratio) (YES in step S208), the processing proceeds to step S210. On the other hand, if the ratio of cnt1/cnt2 is not larger than the determination value "b" (not larger than the predetermined ratio) (NO in step S208), the processing proceeds to step S211.

In step S209, the system controller 113 determines whether the ratio of the contrast values cnt2 to cnt1 calculated in step S206 is larger than the predetermined value. If the ration of cnt2/cnt1 is larger than the predetermined determination value "b" (larger than the predetermined ratio) (YES in step S209), the processing proceeds to step S211. On the other hand, if a ratio of cnt2/cnt1 is not larger than the determination value "b" (not larger than the predetermined ratio) (NO in step S209), the processing proceeds to step S212.

In step S210, the system controller 113 displays the AF frame 201 in the AF frame display device 103 via the AF frame display circuit 118. This is because it is determined that the main object exists in the AF frame 201, since cnt1 is sufficiently larger than cnt2 through display determinations in steps S207 to S208.

In step S211, the system controller 113 displays the AF frame 202 in the AF frame display device 103 via the AF frame display circuit 118. This is because it is determined that the main object exists in the AF frame 202, since cnt2 is sufficiently larger than cnt1 through display determinations in steps S207 to S209.

In step S212, the system controller 113 displays both of the AF frame 201 and the AF frame 202 via the AF frame display circuit 118 in the AF frame display device 103. This is the processing in a case where it is determined that the main object exists in both the AF frame 201 and the AF frame 202, as cnt1 and cnt2 are nearly equal to each other, through the display determinations in steps S207 to S209.

In step S213, the system controller 113 determines whether the SW2 as one of the operation unit is turned on. If the SW2 is not turned on (NO in step S213), the processing in step S213 is repeated. On the other hand, if the SW2 is turned on (YES in step S213), the processing proceeds to step S214.

In step S214, the system controller 113 drives the main mirror 102 to the outside of the imaging light flux via the mirror driving circuit 117, and drives the image sensor 108 to capture an image via the image sensor driving circuit 115.

As described above, in the present exemplary embodiment, contrast values of the region 2 and the region 3 corresponding to the AF frames are calculated at the time of the display determination, and a position of the main object is determined based on the contrast ratio. Generally, since the contrast calculation has less calculation amount than the correlation calculation, increase in release time lag can be further reduced.

In a third exemplary embodiment, an apparatus that performs display determination different from the first exemplary embodiment and the second exemplary embodiment will be described. The configuration of the camera is similar to that of the first exemplary embodiment, and therefore descriptions thereof will not be repeated.

Figure 8:
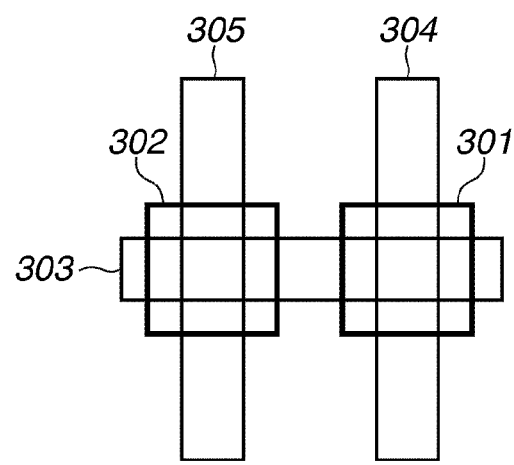
FIG. 8 is a diagram illustrating an arrangement of AF frames and line sensors according to a third exemplary embodiment.

FIG. 8 is a diagram illustrating an arrangement of AF range-finding frames and line sensor fields of view (FOVs) within the imaging screen in the present exemplary embodiment. The AF sensor 109 is provided with a plurality of line sensors in two directions perpendicular to each other, and two AF frames (an AF frame 301 and an AF frame 302) corresponding to a line sensor FOV 303 in a horizontal direction. Further, line sensor FOVs 304 and 305 are arranged in a vertical direction. The line sensor corresponding to the line sensor FOV 303 corresponds to a first focus detection region. Further, the line sensor corresponding to the line sensor FOVs 304 and 305 corresponds to a second focus detection region.

In the present exemplary embodiment, a description will be given based on the premise that focus detection result based on signals obtained by the line sensors corresponding to the line sensor FOV 303 of FIG. 8 has the best reliability level as compared with other line sensors, and focus adjustment control is performed using the line sensor corresponding to the line sensor FOV 303.

Figure 9:
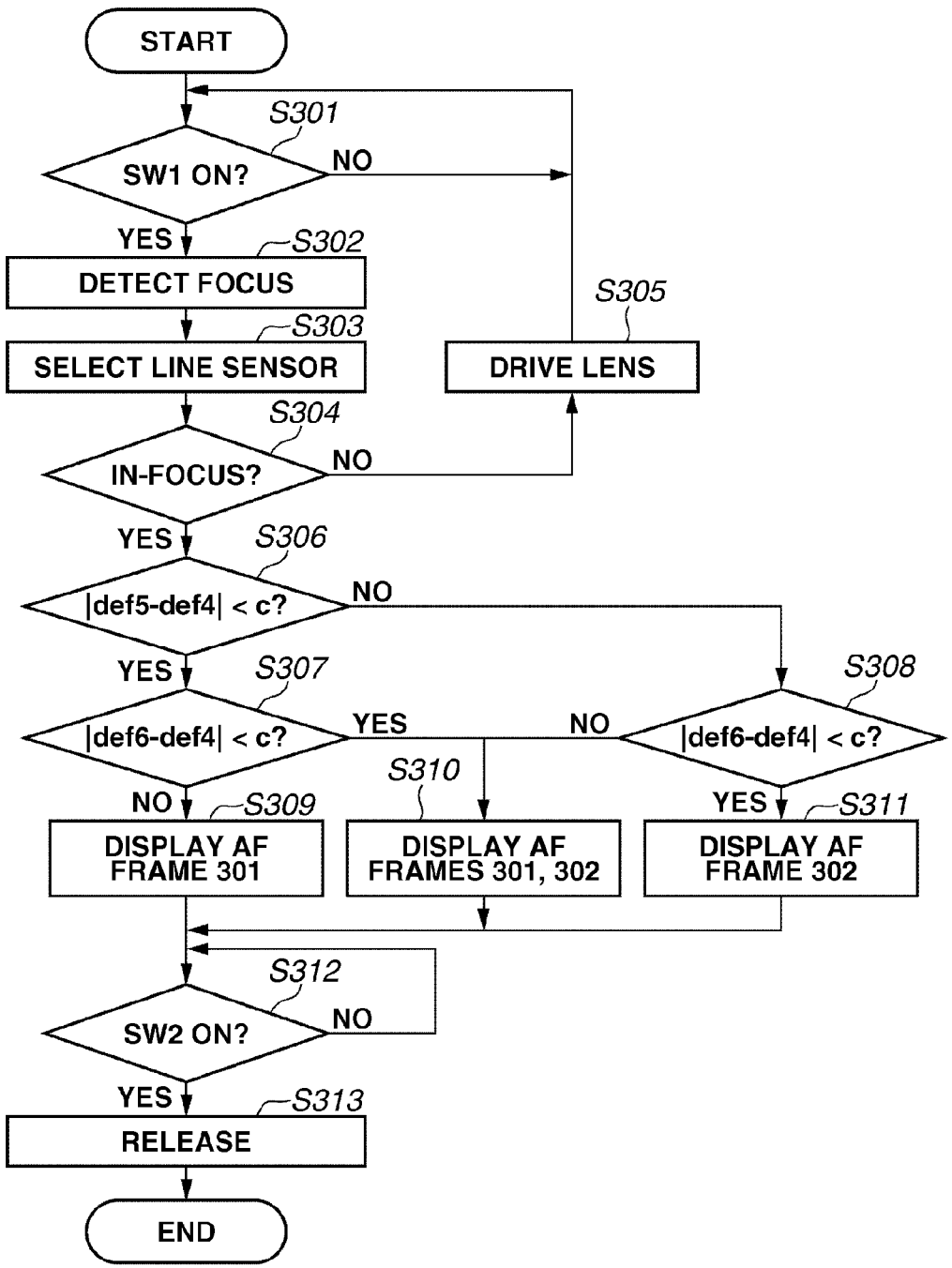
FIG. 9 is a flowchart illustrating an AF operation according to the third exemplary embodiment.

A focus adjustment operation in a camera according to the present exemplary embodiment will be described with reference to a flowchart in FIG. 9.

In step S301, the system controller 113 determines whether the SW1 as one of the operation unit is turned ON. If the SW1 is not turned on (NO in step S301), the processing is repeated until the SW1 becomes turned on. On the other hand, if the SW1 is turned on (YES in step S301), the processing proceeds to step S302.

In step S302, the system controller 113 controls the AF sensor 109 via the AF sensor control circuit 116, and acquires a pair of image signals. Then, the system controller 113 performs focus detection through correlation calculation (phase difference calculation), which is a publicly known technique, based on a pair of image signals obtained from each of a plurality of line sensor pairs.

In step S303, the system controller 113 calculates a reliability for each detection result of a plurality of line sensor pairs obtained in step S302, and determines and selects one with the highest reliability. In this process, a display method for the AF frames will be described below, based on the premise that the detection result of the line sensors corresponding to the line sensor FOV 303 is to be selected, through the reliability level determination.

In step S304, the system controller 113 determines whether the focusing state is in-focus from a detection result def4 of the line sensors corresponding to the line sensor FOV 303 selected in step S303. If the detection result def4 is within a range of an in-focus determination value, for example, not larger than $\frac{1}{4}F\delta$ (F: aperture value of lens, $\delta$: permissible circle-of-confusion diameter, for example, for $\delta=20$ μm, 10 μm in full-aperture opening of F2.0 lens), the system controller 113 determines that the focusing state is in-focus (YES in step S304), the processing proceeds to step S306. On the other hand, if the detection result def4 is larger than the in-focus determination value (for example, $\frac{1}{4}F\delta$) (NO in step S304), the processing proceeds to step S305.

In step S305, the system controller 113 converts the detection result def4 into the number of pulses, which is a driving amount of lens, and drives the photographic lens 101 via the lens driving device 119, then the processing returns to steps S301. The operations in steps S301 to S305 are repeated until it is determined to be in-focus in step S304.

The operations in the following steps S306 to S308 are related to a display determination operation. In step S306, it is determined whether a difference between the detection result def4 of the line sensor 303 and the detection result def5 of the line sensor 304 calculated in step S302 is smaller than a predetermined value. If the difference (|def5−def4|) is smaller than a determination value "c" (YES in step S306), the processing proceeds to step S307. On the other hand, if the difference (|def5−def4|) is not smaller than the determination value "c" (NO in step S306), the processing proceeds to step S308. In this process, the predetermined value "c" is set to a larger value (for example, $4F\delta$) than an in-focus determination value.

In step S306, it may be determined whether |def5| in place of |def5−def4| is smaller than a determination value "c'". The determination value "c'" in this case is set to a larger value than the in-focus determination value.

In step S307, it is determined whether a difference between the detection result def4 of the line sensor FOV 303 in step S302 and a detection result def6 of the line sensor FOV 305 is smaller than the determination value "c" (second predetermined value). If the difference (|def6−def4|) is smaller than the determination value "c" (YES in step S307), the processing proceeds to step S310. On the other hand, if the difference (|def6−def4|) is not smaller than the determination value "c" (NO in step S307), the processing proceeds to step S309. In step S310, the system controller 113 displays both of the AF frame 301 and the AF frame 302 in the AF frame display device 103 via the AF frame display circuit 118. This is because it is determined that the main object exists in both of the AF frame 301 and the AF frame 302, since the detection result def5 and the detection result def6 substantially coincide with the detection result def4 through display determinations in steps S306 and S307.

In step S309, the system controller 113 displays the AF frame 301 in the AF frame display device 103 via the AF frame display circuit 118. This is because it is determined that the detection result of the AF frame 302 is obtained from the background or the like departing from the main object, and the main object exists in the AF frame 301, since only the detection result def6 is significantly different from the detection result def4, through the display determinations in steps S306 and S307.

On the other hand, even when the processing proceeds to step S308, the system controller 113 determines whether a difference between the detection result def4 of the line sensor FOV 303 and the detection result def6 of the line sensor FOV 305 is smaller than the determination value "c". If the difference (|def6−def4|) is smaller than the determination value "c" (YES in step S308), the processing proceeds to step S311. On the other hand, if the difference (|def6−def4|) is not smaller than the determination value "c" (NO in step S308), the processing proceeds to step S310. The system controller 113 displays both of the AF frame 301 and the AF frame 302. This is because it cannot be determined whether the main object exists in either the AF frame 301 or the AF frame 302, since both of the detection result def5 and the detection result def6 are significantly different from the detection result def4.

In steps S307 and S308, it may be determined whether |def6| in place of (|def6−def4| is smaller than the determination value "c'".

In step S311, the system controller 113 displays the AF frame 302 in the AF frame display device 103 via the AF frame display circuit 118. This is because it is determined that the result of the AF frame 301 is obtained from the background or the like departing from the main object, and the main object exists in the AF frame 302, since only the detection result def5 is significantly different from the detection result def4 through the display determinations in steps S306 to S308.

In step S312, the system controller 113 determines whether the SW2 as one of the operation unit is turned on. If the SW2 is not turned on (NO in step S312), the processing in step S312 is repeated. On the other hand, if the SW2 is turned on (YES in step S312), the processing proceeds to step S313.

In step S313, the system controller 113 drives the main mirror 102 to the outside of the imaging light flux via the mirror driving circuit 117, and drives the image sensor 108 to capture an image via the image sensor driving circuit 115.

As described above, in a case where two AF frames 301 and 302 exist on the line sensor FOV 303 for performing focus adjustment, the AF frame in which the main object exists can be determined from the detection results of the line sensor FOVs 304 and 305 perpendicular to the line sensor FOV 303.

In a fourth exemplary embodiment, an apparatus that performs display determinations different from the above-described exemplary embodiments will be described. The configuration of the camera and arrangement of the line sensors are similar to those in the first exemplary embodiment, and therefore descriptions thereof will not be repeated.

In the present exemplary embodiment, descriptions will be given based on the premise that focus detection result based on signals obtained by the line sensors corresponding to the line sensor FOV 203 of FIG. 3 has the best reliability level as compared with other line sensors, and focus adjustment control is performed by the line sensors corresponding to the line sensor FOV 203.

Figure 10:
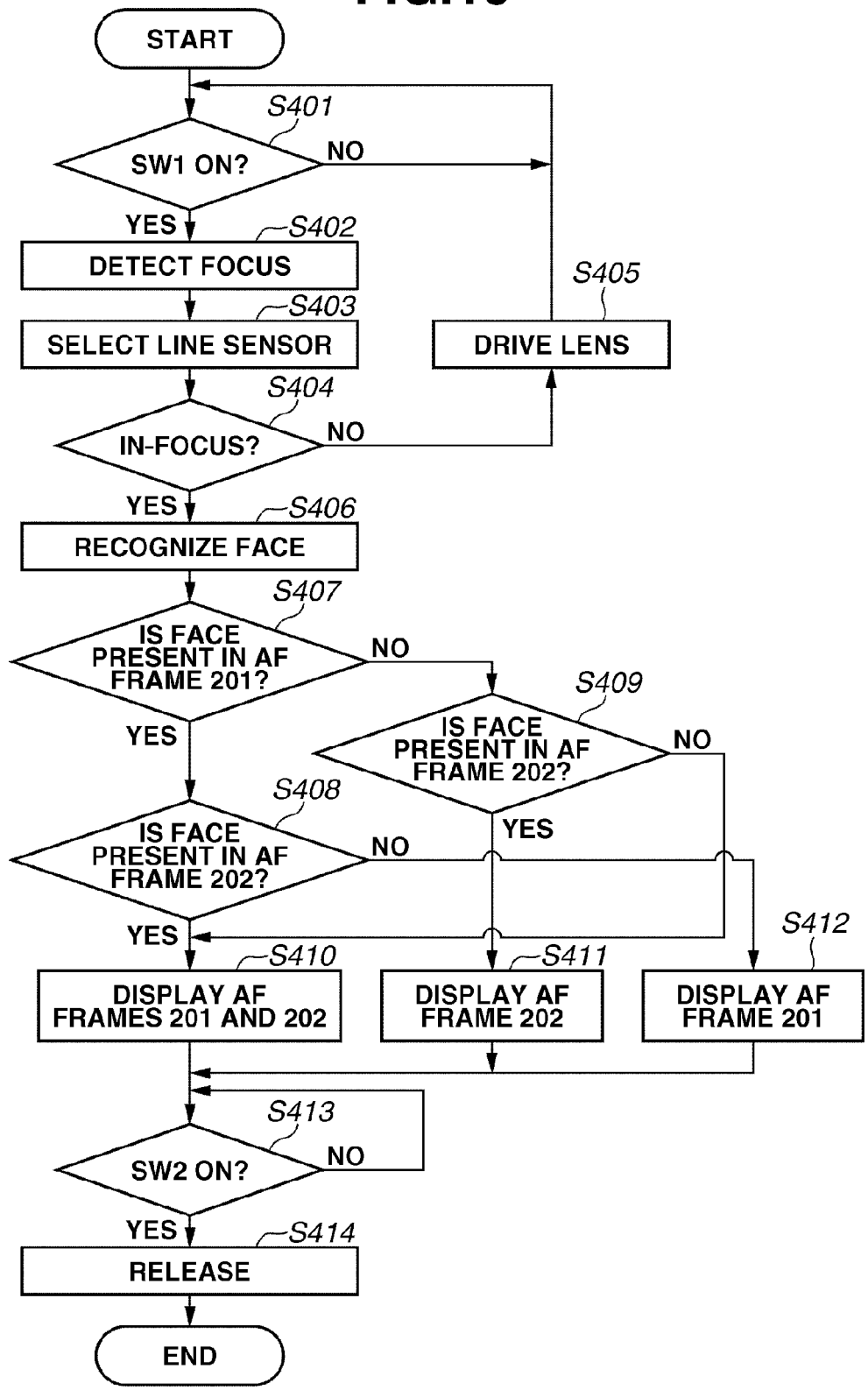
FIG. 10 is a flowchart illustrating an AF operation according to a fourth exemplary embodiment.

A focus adjustment operation in the camera according to the present exemplary embodiment will be described with reference to a flowchart of FIG. 10.

In step S401, the system controller 113 determines whether the SW1 as one of the operation unit is turned ON. If the SW1 is not turned on (NO in step S401), the processing is repeated until the SW1 is turned ON. On the other hand, if the SW1 is turned on (YES in step S401), the processing proceeds to step S402.

In step S402, the system controller 113 controls the AF sensor 109 via the AF sensor control circuit 116, and acquires a pair of image signals. Then, the system controller 113 performs focus detection through correlation calculation (phase difference calculation), which is a publicly known technique, based on accumulated signals of a plurality of line sensors.

In step S403, the system controller 113 calculates a reliability for each detection result of a plurality line sensor pairs obtained in step S402, and determines and selects one with the highest reliability. In this process, a display method for AF frames will be described below, based on the premise that detection result of the line sensors corresponding to the line sensor FOV 203 is to be selected.

In step S404, the system controller 113 determines whether the focusing state is in-focus from a detection result def1 of the line sensors corresponding to the line sensor FOV 203 selected in step S403. If the detection result def1 is within a range of in-focus determination value, for example, not larger than ¼Fδ (F: aperture value of lens, δ: permissible circle-of-confusion diameter, for example, for δ=20 μm, 10 μm in full-aperture opening of F2.0 lens), the system controller 113 determines that the focusing state is in-focus (YES in step S404), the processing proceeds to step S406. On the other hand, if the detection result def1 is larger than the in-focus determination value (for example, ¼Fδ) (NO in step S404), the processing proceeds to step S405.

In step S405, the system controller 113 converts the detection result def1 into the number of pulses, which is a driving amount of the lens, and drives the photographic lens 101 via the lens driving device 119, then the processing returns to step S401. The operations in steps S401 to S405 are repeated until it is determined to be in-focus in step S404.

In step S406, the AE sensor control circuit 114 detects a specific object, based on signals captured by the AE sensor 106. In this process, the AE sensor control circuit 114 performs face detection, which is a publicly known technique as specific object detection, and when a face is present in the imaging screen, and transmits information such as size and position of a face region to the system controller 113.

The operations in the following steps S407 to S409 are related to a display determination operation. In step S407, the system controller 113 determines whether the face region detected in step S406 is present in the AF frame 201. If a face or a part of the face is present within the AF frame 201 (YES in step S407), the processing proceeds to step S408. On the other hand, if the face is not present in the AF frame 201 (NO in step S407), the processing proceeds to step S409.

In step S408, the system controller 113 determines whether the face region detected in step S406 is present in the AF frame 202. If the face or a part of the face is present in the AF frame 202 (YES in step S408), the processing proceeds to step S410. On the other hand, if the face is not present within the AF frame 202 (NO in step S408), the processing proceeds to step S412.

In step S409, the system controller 113 determines whether the face region detected in step S406 is present in the AF frame 202. If the face or a part of the face is present in the AF frame 202 (YES in step S409), the processing proceeds to step S411. On the other hand, if the face is not present in the AF frame 202 (NO in step S409), the processing proceeds to step S410.

In step S410, the system controller 113 displays both of the AF frame 201 and the AF frame 202 in the AF frame display device 103 via the AF frame display circuit 118. The operation is the processing when a face as the main object is present in both of the AF frame 201 and the AF frame 202, or when a face is not present in both of the AF frame 201 and the AF frame 202, through the display determinations in steps S407 to S409. In the present exemplary embodiment, since discrimination of the main object cannot be performed when a face is not present in both of the AF frames, both of the AF frame 201 and the AF frame 202 are displayed.

In step S411, the system controller 113 displays the AF frame 202 in the AF frame display device 103 via the AF frame display circuit 118. The operation is the processing when a face as the main object is present in the AF frame 202, through the display determinations in step S407 to S409.

In step S412, the system controller 113 displays the AF frame 201 in the AF frame display device 103 via the AF frame display circuit 118. The operation is the processing when a face as the main object is present in the AF frame 201, through the display determinations in steps S407 to S409.

In step S413, the system controller 113 determines whether the SW2 as one of the operation unit is turned on. If the SW2 is not turned on (NO in step S413), the processing in step S413 is repeated. On the other hand, if the SW2 is turned on (YES in step S413), the processing proceeds to step S414.

In step S414, the system controller 113 drives the main mirror 102 to the outside of the imaging light flux via the mirror driving circuit 117, and drives the image sensor 108 to capture an image via the image sensor driving circuit 115.

As described above, in the present exemplary embodiment, when two AF frames 201 and 202 are present on the line sensor 203, an AF frame where the main object exists can be determined, by performing face detection within the imaging scene, and displaying the AF frame 201 and the AF frame 202 corresponding to the face region.

In a fifth exemplary embodiment, an apparatus that performs focus adjustment control by the image sensor 108 at the time of live view, instead of focus adjustment control of the phase difference detection method by the AF sensor 109, will be described.

FIGS. 11A to 13B are diagrams illustrating a structure of an imaging pixel and that of a focus detection pixel. In the fifth exemplary embodiment, a Bayer array is employed in which two pixels having G (green color) spectral sensitivity are diagonally arranged in 2 rows×2 columns=4 pixels, and pixels respectively having R (red color) and B (blue color) spectral sensitivities are arranged as the other two pixels. Then, focus detection pixels with a structure as will be described below are distributed and arranged between pixels of the Bayer arrays in accordance with a predetermined rule.

Figure 11A:
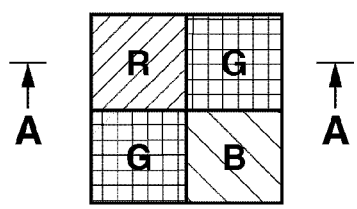
FIGS. 11A and 11B are diagrams illustrating an arrangement and structure of imaging pixels according to a fifth exemplary embodiment.
Figure 11B:
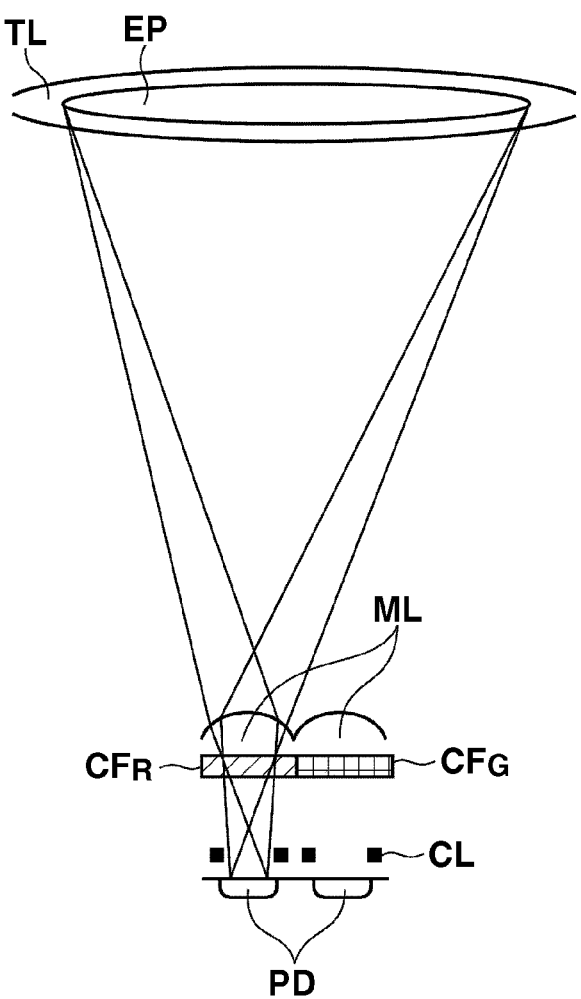

FIGS. 11A and 11B are diagrams illustrating an arrangement and a structure of imaging pixels. FIG. 11A is a plan view of 2 rows×2 columns imaging pixels. As is generally known, in the Bayer array, G pixels are diagonally arranged, and R and B pixels are arranged as the other two pixels. This 2 rows×2 columns structure is repetitively arranged.

A cross section taken along a line A-A in FIG. 11A is illustrated in FIG. 11B. ML is an on-chip microlens arranged on the foreground of each pixel, $CF_R$ is a color filter of R (Red), and $CF_G$ is a color filter of G (Green), photodiode (PD) is schematic representation of photoelectric conversion portion, a contact layer (CL) is a wiring layer for forming a signal line which transmits various types of signals. TL is schematic representation of an imaging optical system.

The on-chip microlens ML and photoelectric conversion portion PD for each imaging pixel are configured to capture a light flux which has passed through the imaging optical system taking lens (TL) as effectively as possible. In other words, an exit pupil (EP) of the imaging optical system TL and the photoelectric conversion portion PD are in a conjugate relationship due to the microlens ML, and the effective area of the photoelectric conversion portion is designed to have large effective area. FIG. 11B illustrates a light flux entering the R pixel, but the G pixel and B (Blue) pixel also have the same structure. Therefore, the exit pupil EP corresponding to each of R, G, and B imaging pixels has a large diameter, and a light flux (light quantum) from an object can be efficiently captured to increase the S/N ratio of an image signal.

Figure 12A:
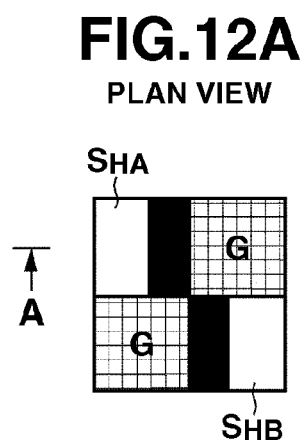
FIGS. 12A and 12B are diagrams illustrating an arrangement and structure of focus detection pixels for performing pupil division in a horizontal direction according to the fifth exemplary embodiment.
Figure 12B:
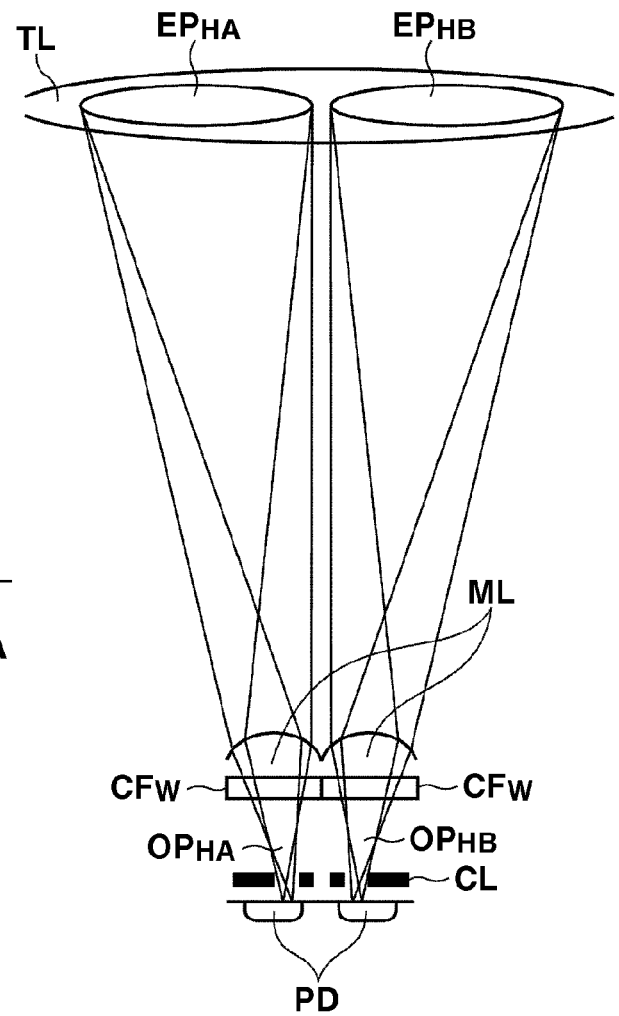

FIGS. 12A and 12B illustrate an arrangement and a structure of focus detection pixels for performing pupil division in the horizontal direction (lateral direction) of the imaging optical system. The horizontal direction or lateral direction is defined as, when the user holds a camera so that an optical axis of the imaging optical system becomes parallel to the horizontal direction, a direction along a straight line which is perpendicular to the optical axis, and extends in the horizontal direction. FIG. 12A is a plan view of pixels of 2 rows×2 columns including focus detection pixels. When obtaining an image signal for recording or viewing, the main component of luminance information is acquired by G pixel. The image recognition characteristics of humans are sensitive to luminance information. Thus, if G pixels are missed, degradation of the image quality is easily perceived. On the other hand, R or B pixels are used to acquire color information (color difference information). However, the visual characteristics of humans are not sensitive to color information. Hence, even when pixels for acquiring color information are slightly missed, degradation of image quality is hardly recognized. Thus, in the present exemplary embodiment, G pixels out of 2 rows×2 columns pixels are left as imaging pixels, and R and B pixels are replaced with focus detection pixels. In FIG. 12A, $S_{HA}$ and $S_{HB}$ represent focus detection pixels.

A cross section taken along the line A-A in FIG. 12A is illustrated in FIG. 12B. The microlens ML and the photoelectric conversion portion PD have the same structure as those of the imaging pixels illustrated in FIG. 11B. In the present exemplary embodiment, a signal from the focus detection pixel is not used for image generation, so that a transparent film $CF_W$ (white) is arranged in place of a color filter for color separation. To perform pupil division by the image sensor 108, the aperture opening of the wiring layer CL deviates in one direction from the center line of the microlens ML. More specifically, since it is eccentric to right side, an aperture opening $OP_{HA}$ of the pixel $S_{HA}$ receives a light flux which has passed through an exit pupil $EP_{HA}$ on the left side of the imaging optical system TL. Similarly, an aperture opening $OP_{HB}$ of the pixel $S_{HB}$ deviates to the left, and receives a light flux having passed through a right exit pupil $EP_{HB}$ of the imaging optical system TL. Therefore, the pixels $S_{HA}$ are arrayed regularly in the horizontal direction, and the object image acquired by these pixel groups is defined as "A" image. The pixels $S_{HB}$ are also arrayed regularly in the horizontal direction, and the object image acquired by these pixel groups is defined as "B" image. Then, by detecting the relative positions of the "A" and "B" images, the focus detection of the object image can be performed.

The above-described pixels $S_{HA}$ and $S_{HB}$ can detect the focus of an object, for example, a vertical line having a luminance distribution in the lateral direction of the imaging scene, but cannot detect the focus of a horizontal line having a luminance distribution in the longitudinal direction. Thus, in the present exemplary embodiment, to enable focus detection in the horizontal line, there is also provided pixels for dividing the pupil even in the vertical direction (longitudinal direction) of the imaging optical system.

Figure 13B:
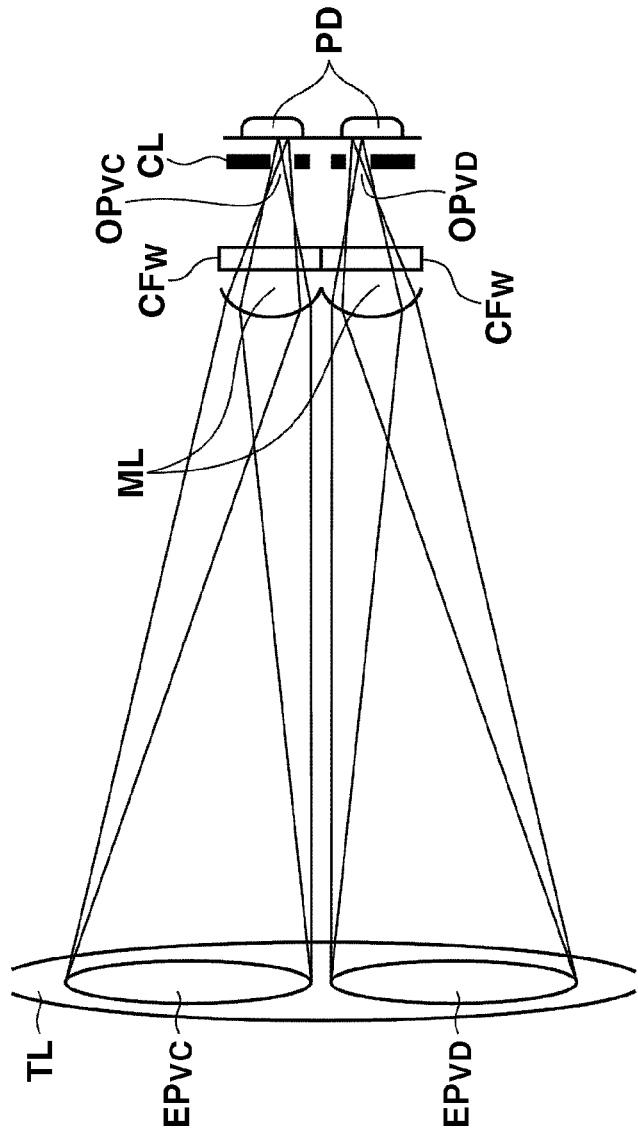
FIGS. 13A and 13B are diagrams illustrating an arrangement and structure of focus detection pixels for performing pupil division in a vertical direction according to the fifth exemplary embodiment.
Figure 13A:
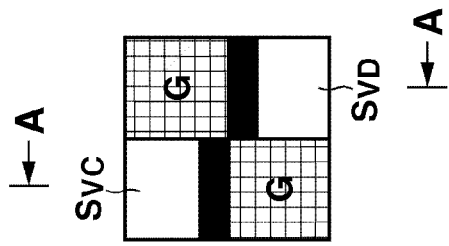

FIGS. 13A and 13B illustrate the arrangement and structure of the focus detection pixels for dividing the pupil in the vertical direction (in other words, the top-to-bottom direction or longitudinal direction) of the imaging optical system. The vertical direction, top-to-bottom direction, or longitudinal lateral direction is defined as a direction along a straight line perpendicular to the optical axis and extends in the vertical direction when the user holds the camera so that the optical axis of the imaging optical system becomes parallel to the horizontal direction. FIG. 13A is a plan view of 2 rows×2 columns pixels including the focus detection pixels. Similar to FIG. 12A, G pixels are left as imaging pixels, and R and B pixels are replaced with focus detection pixels. In FIG. 13A, $S_{VC}$ and $S_{VD}$ represent the focus detection pixels.

A cross section taken along a line A-A of FIG. 13A is illustrated in FIG. 13B. The pixel in FIG. 12B has a structure for separating the pupil in the lateral direction, but the pixels in FIG. 13B only have pupil separation direction in the longitudinal direction, and have the same structure of the pixels in FIG. 12B. More specifically, an aperture opening $OP_{VC}$ of the pixel $S_{VC}$ deviates downward, and as a result, receives a light flux having passed through an upper exit pupil $EP_{VC}$ of the imaging optical system TL. Similarly, an aperture opening $OP_{VD}$ of the pixel $S_{VD}$ deviates upward, and as a result, receives a light flux having passed through a lower exit pupil $EP_{VD}$ of the imaging optical system TL. Therefore, pixels $S_{VC}$ are arrayed regularly in the vertical direction, and an object image acquired by these pixel groups is defined as "C" image. Also, pixels $S_{VD}$ are arrayed regularly in the vertical direction, and an object image acquired by these pixel groups is defined as "D" image. By detecting relative positions of the "C" image and the "D" image, an out-of-focus amount (defocus amount) of the object image having a luminance distribution in the vertical direction can be detected.

Figure 14:
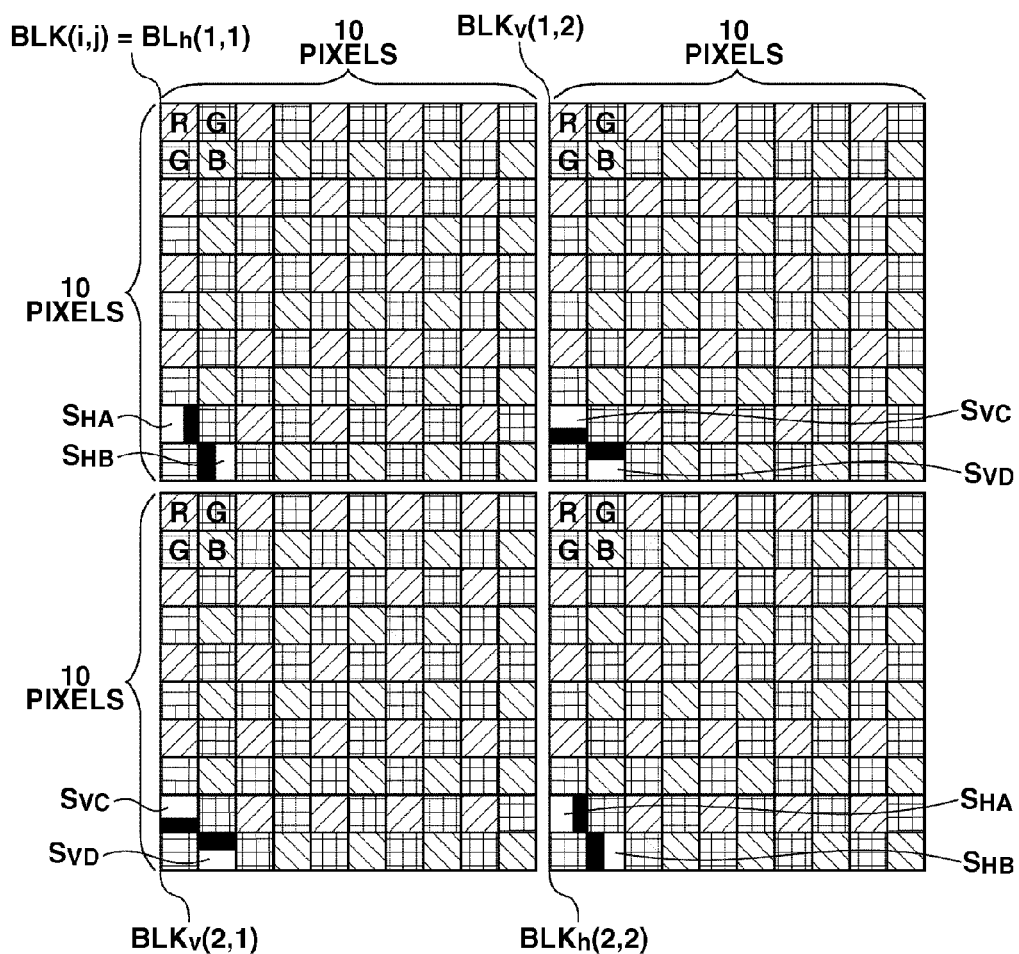
FIG. 14 is a diagram illustrating an arrangement rule of imaging pixels and focus detection pixels according to the fifth exemplary embodiment.

FIG. 14 is a diagram illustrating an arrangement rule for imaging pixels and focus detection pixels illustrated in FIG.

11A through FIG. 13B. FIG. 14 is a diagram illustrating an arrangement rule for a minimum unit when discretely arranging focus detection pixels between the imaging pixels. In FIG. 14, 10 rows×10 columns=100 pixels are defined as one block. Then, in upper leftmost block BLK (1, 1), bottom leftmost R pixel and B pixel are replaced with a pair of focus detection pixels $S_{HA}$ and $S_{HB}$ for performing pupil division in the horizontal direction.

In a block BLK (1, 2) on the immediate right side of the BLK (1, 1), the bottom leftmost R pixel and B pixel are similarly replaced with a pair of focus detection pixels $S_{VC}$ and $S_{VD}$ for performing pupil division in the vertical direction. Further, a block BLK (2, 1) adjacent below the first block BLK (1, 1) has the same pixel array as that of the block BLK (1, 2). Then, a block BLK (2, 2) on the immediate right side of the BLK (2, 1) has the same pixel array as that of the first block BLK (1, 1).

When this arrangement rule is universally expressed, in a block BLK (i, j), a focus detection pixel for horizontal pupil division is arranged when (i+j) is an even number, and a focus detection pixel for vertical pupil division is arranged when (i+j) is an add number. The focus detection pixel arranges are arranged in a whole area of the imaging screen in this unit. By extracting the focus detection pixels discretely arranged in this way in the frame whole area by a predetermined region unit, focus detection can be performed with respect to a plurality of regions on the imaging frame, like the line sensors of the AF sensor 109.

In the present exemplary embodiment, the digital signal processing circuit 112 is provided with a detection circuit that detects in-focus state of the photographic lens 101 according to object image signals output from the focus detection pixels of the image sensor 108

Figure 15:
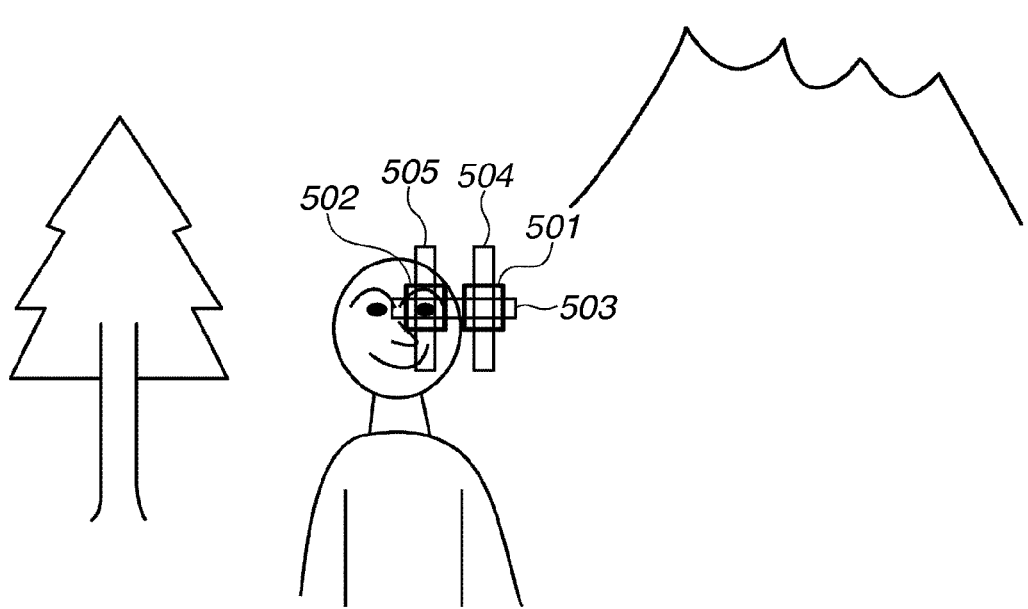
FIG. 15 is a diagram illustrating an arrangement of AF frames and focus detection regions according to the fifth exemplary embodiment.

FIG. 15 is a diagram illustrating an arrangement of AF frames and focus detection regions in the imaging screen in the fifth exemplary embodiment.

On a focus detection region 503, which is one of a plurality of focus detection regions, in the horizontal direction, two AF frames (an AF frame 501 and an AF frame 502) are arranged. Further, in the AF frame 501 and the AF frame 502, a focus detection region 504 and a focus detection region 505 each are arranged in the vertical direction.

The display determination of the AF frames 501 and 502 enables display of the AF frames appropriately by applying the display determinations which have been described in the above exemplary embodiments. The AF frames which have been display-determined are displayed from the display device 124 by the digital signal processing circuit 112.

As described above, even when an imaging plane phase difference AF is performed as in the present exemplary embodiment, display determination of the present invention can be performed.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-137923 filed Jun. 19, 2012, which is hereby incorporated by reference herein in its entirety.

What is claimed is:

1. A focus adjustment apparatus configured to display an in-focus state in a display region in accordance with control of a focus lens position, the focus adjustment apparatus comprising:
   a signal generation unit configured to output a pair of image signals from a focus detection region, the image signals being generated by photoelectrically converting light having passed through an imaging optical system; and
   a control unit configured to detect a defocus amount based on the pair of image signals output from a first focus detection region having a plurality of corresponding display regions, and to control a position of the focus lens based on the defocus amount corresponding to the first focus detection region,
   wherein the control unit detects a defocus amount corresponding to each of second focus detection regions which are arranged in a different detection from the first focus detection region, and determines at least one display region to indicate an in-focus state from among the display regions corresponding to the first focus detection region, in accordance with the control of the focus lens position, based on the defocus amount corresponding to each of the second focus detection regions.

2. The focus adjustment apparatus according to claim 1, wherein the control unit determines, to indicate an in-focus state, a display region corresponding to the second focus detection region of which difference in defocus amount from the first focus detection region is smaller than that of another second focus detection region.

3. The focus adjustment apparatus according to claim 2, wherein the control unit determines, to indicate an in-focus state, a display region corresponding to the second focus detection region of which difference in defocus amount from the first focus detection region is smaller than a first predetermined value.

4. The focus adjustment apparatus according to claim 3, wherein the control unit determines, if a difference in defocus amount from the first focus detection region is not smaller than the first predetermined value in all second focus detection regions, all display regions corresponding to the first focus detection region to indicate an in-focus state.

5. The focus adjustment apparatus according to claim 1, wherein the control unit determines, after moving the focus lens to a position at which the defocus amount of the first focus detection region becomes smaller than a predetermined determination value, a display region to indicate an in-focus state based on the defocus amount corresponding to each of the second focus detection regions.

6. The focus adjustment apparatus according to claim 5, wherein the control unit determines, to indicate an in-focus state, a display region corresponding to a second focus detection region of which difference in defocus amount from the first focus detection region is smaller than a first predetermined value, and wherein the first predetermined value is greater than the predetermined determination value.

7. The focus adjustment apparatus according to claim 5, wherein the control unit uses, in a case where the defocus amount corresponding to each of the second focus detection regions is detected, a photoelectric conversion result of each of the second focus detection regions when the defocus amount corresponding to the first focus detection region has become smaller than the predetermined determination value.

8. The focus adjustment apparatus according to claim 1, wherein the signal generation unit is provided with a plurality of the first focus detection regions, and generates and outputs the pair of image signals from respective first focus detection regions, and
wherein the control unit calculates a reliability of the pair of image signals, and controls a position of the focus lens based on the defocus amount corresponding to the first focus detection region which has generated an image signal with the highest reliability.

9. The focus adjustment apparatus according to claim 1, wherein the control unit calculates a reliability of the pair of image signals in each of the second focus detection regions, and in a case where the reliability is not larger than a predetermined threshold value, displays an in-focus state in all display regions corresponding to the first focus detection region.

10. The focus adjustment apparatus according to claim 1, wherein the second focus detection regions are arranged perpendicular to the first focus detection region.

11. A control method for a focus adjustment apparatus configured to display an in-focus state in a display region in accordance with control of a focus lens position, the method comprising:
outputting a pair of image signals from a focus detection region, the image signals being generated by photoelectrically converting light having passed through an imaging optical system;
detecting a defocus amount based on the pair of image signals output from a first focus detection region having a plurality of corresponding display regions;
controlling a position of the focus lens based on the defocus amount corresponding to the first focus detection region;
detecting a defocus amount corresponding to each of second focus detection regions which are arranged in a different direction from the first focus detection region; and
determining at least one display region to indicate an in-focus state from among the display regions corresponding to the first focus detection region in accordance with the control of the focus lens position, based on the defocus amount corresponding to each of the second focus detection regions.

12. A focus adjustment apparatus configured to display an in-focus state in a display region in accordance with control of a focus lens position, the focus adjustment apparatus comprising:
a signal generation unit configured to output a pair of image signals from a focus detection region, the image signals being generated by photoelectrically converting light having passed through an imaging optical system; and
a control unit configured to detect a defocus amount based on the pair of image signals output from a first focus detection region having a plurality of corresponding display regions, and to control a position of the focus lens based on the defocus amount corresponding to the first focus detection region,
wherein the control unit detects a defocus amount corresponding to each of second focus detection regions which are arranged adjacent to the first focus detection region, and determines at least one display region to indicate an in-focus state from among the display regions corresponding to the first focus detection region, in accordance with the control of the focus lens position based on the defocus amount corresponding to each of the second focus detection regions.

13. A control method for a focus adjustment apparatus configured to display an in-focus state in a display region in accordance with control of a focus lens position, the method comprising:
outputting a pair of image signals from a focus detection region, the image signals being generated by photoelectrically converting light having passed through an imaging optical system;
detecting a defocus amount based on the pair of image signals output from a first focus detection region having a plurality of corresponding display regions;
controlling a position of the focus lens based on the defocus amount corresponding to the first focus detection region;
detecting a defocus amount corresponding to each of second focus detection regions which are arranged adjacent to the first focus detection region; and
determining at least one display region to indicate an in-focus state from among the display regions corresponding to the first focus detection region, in accordance with the control of the focus lens position, based on the defocus amount corresponding to each of the second focus detection regions.

14. A focus adjustment apparatus configured to display an in-focus state in a display region in accordance with control of a focus lens position, the focus adjustment apparatus comprising:
a signal generation unit configured to output a pair of image signals from a focus detection region, the image signals being generated by photoelectrically converting light having passed through an imaging optical system; and
a control unit configured to detect a defocus amount based on the pair of image signals output from a first focus detection region having a plurality of corresponding display regions, and to control a position of the focus lens based on the defocus amount corresponding to the first focus detection region,
wherein a plurality of second focus detection regions are arranged across the first focus detection region, and each of the display regions corresponding to the first focus detection region is arranged corresponding to an intersection of the first focus detection region and each of the second focus detection regions,
wherein the control unit detects a defocus amount corresponding to each of the second focus detection regions, and determines at least one display region to indicate an in-focus state from among the display regions corresponding to the first focus detection region based on the defocus amount corresponding to the first focus detection region and the defocus amount corresponding to each of the second focus detection regions.

15. A control method for a focus adjustment apparatus configured to display an in-focus state in a display region in accordance with control of a focus lens position, the method comprising:

outputting a pair of image signals from a focus detection region, the image signals being generated by photoelectrically converting light having passed through an imaging optical system;

detecting a defocus amount based on the pair of image signals output from a first focus detection region having a plurality of corresponding display regions;

controlling a position of the focus lens based on the defocus amount corresponding to the first focus detection region;

detecting a defocus amount corresponding to each of a plurality of second focus detection regions, wherein the second focus detection regions are arranged across the first focus detection region, and each of the display regions corresponding to the first focus detection region is arranged corresponding to an intersection of the first focus detection region and each of the second focus detection regions; and determining at least one display region to indicate an in-focus state from among the display regions corresponding to the first focus detection region based on the defocus amount corresponding to the first focus detection region and the defocus amount corresponding to each of the second focus detection regions.

* * * * *